Sept. 15, 1936.  R. HAAG  2,054,562
INJECTION INTERNAL COMBUSTION ENGINE
Filed May 22, 1935
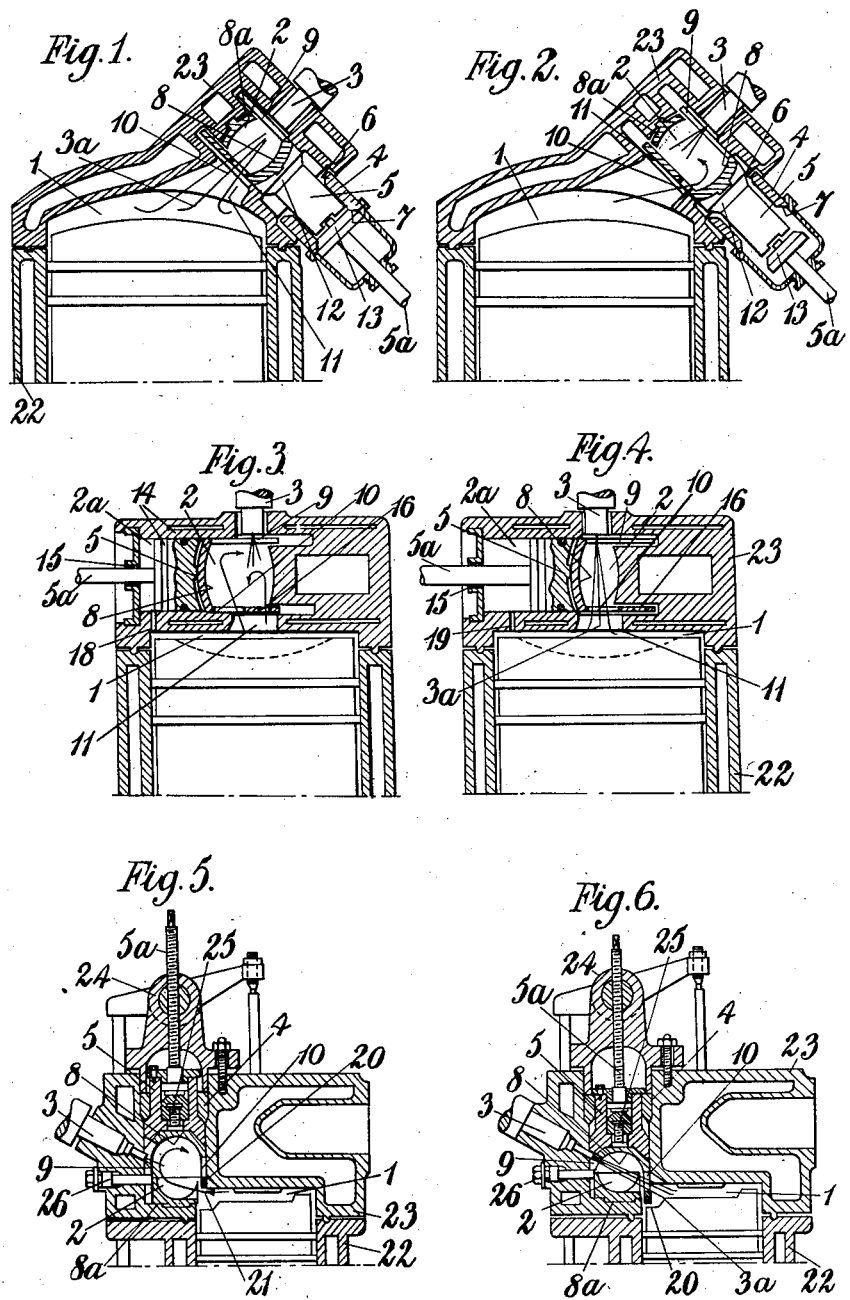

Patented Sept. 15, 1936

2,054,562

UNITED STATES PATENT OFFICE 2,054,562

INJECTION INTERNAL COMBUSTION ENGINE

Rudolf Haag, Freising, near Munich, Germany, assignor of one-half to Dr. Ing. h. c. F. Porsche G. m. b. H., Stuttgart, Germany Application May 22, 1935, Serial No. 22,877
In Germany October 2, 1933

6 Claims. (Cl. 123—48)

This invention relates to an injection internal combustion engine having a precombustion chamber which is disposed above or laterally of the power cylinder, is variable by means of a controlling sliding member, and the volume of which is diminished when starting the engine and enlarged for normal operation.

In the known engines of this kind the directions of flow of the injected fuel and of the combustion air entering from the cylinder space into the precombustion chamber always remain the same, both when starting up the engine and during normal operation. Owing to these uniform conditions of flow, the preparation of the mixture and the way in which it is ignited can be only little influenced from starting up to full load operation of the engine, which has the known disadvantage that the combustion takes place too sluggishly in the cold engine and too fiercely in the hot engine. Incomplete combustion with a smoky exhaust, high combustion pressures with unsteady running and uneconomical fuel consumption at each change of load are the unavoidable consequences.

The object of this invention is to provide means whereby the above difficulties may be overcome. Such means, as illustrated in detail hereafter, preferably include the use of a hollow slide member as the precombustion chamber which has a communicating opening in its wall, between the precombustion chamber and the cylinder space, which, with the precombustion chamber reduced upon movement of the sliding member in one direction (during starting), lies in the axial direction of the fuel as it is injected through the precombustion chamber into the cylinder space and, with the precombustion chamber enlarged upon movement of the sliding member in the opposite direction (during normal operation) is displaced out of this axial direction, whereby the combustion air from said cylinder space entering the precombustion chamber through said communicating opening during the compression stroke of the piston in the power cylinder, is conveyed tangentially to the precombustion chamber and is mixed with the fuel as it is injected into the precombustion chamber. This provides a fundamental difference in the mode of operation during starting and during normal operation, which is based on the difference in the conditions of flow in these operative states.

For, during starting, the fuel is injected into a very quiescent and at the same time very hot body of air, the injection being directly through the precombustion chamber and into the cylinder space, so that a proper ignition of the mixture in said space substantially only through the final compression temperature is ensured. During normal operation, on the other hand, the fuel is injected into a very energetically eddying and at the same time less hot body of air, the injection being into the precombustion chamber, so that a proper ignition of the mixture is obtained in said precombustion chamber substantially through the favorable admixture of the fuel with the hot combustion air in said precombustion chamber. It is thus possible, by a gradual enlargement of the precombustion chamber volume as the load increases, to operate the engine with constantly decreasing final compression pressures, whereby not only the sureness of the ignition, the good quality of the combustion, but also the steady, smooth running of the engine with an economical consumption throughout the entire range of operation can be maintained.

Several constructional examples of the invention are shown in the accompanying drawing, in which Fig. 1 is a vertical sectional view of a power cylinder with the precombustion chamber disposed above at an inclination, in the starting position;

Fig. 2, a corresponding section in the full load position;

Fig. 3, a vertical sectional view of the power cylinder with the precombustion chamber disposed above horizontally, in the full load position;

Fig. 4, a corresponding, but slightly modified section in the starting position;

Fig. 5, a vertical sectional view of the power cylinder with the precombustion chamber disposed alongside, in the full load position and Fig. 6, a corresponding section, in the starting position.

In the example according to Figs. 1 and 2 the precombustion chamber 2 is situated in an extension of the cylinder head 23 forming an auxiliary chamber which is in communication through a neck 11 with the cylinder space 1. The walls of the precombustion chamber 2 are formed by the bell-shaped liner 8 of a control piston 5 and the stationary liner 8a. As hereinafter explained more in detail, the liner 8 is movable relatively to the liner 8a. The control piston 5 is slidably mounted in and engages the inner walls of a guide ring 4. This piston is actuated by means of a control spindle 5a in such a manner that the seating surface 12 of the control piston 5 or the seating surface 13 of the control spindle 5a can be caused to bear optionally against the seating surfaces 6, 7 of the guide ring 4. The bell-shaped liner 8 is provided at the side facing the injection nozzle 3 with a longitudinal slot 9 extending in the direction of displacement and at the opposite side with an opening 10 adapted to the shape of the cross-section of the fuel jet 3a. The liner 8 and the piston 5 need only be held together by the pressure developed within the precombustion chamber, so that axial movement of the piston within the guide ring in one direction will cause similar movement of the liner 8 in the same direction in the extension of the cylinder head 23, while stationary liner 8a is fixed in any suitable manner to the cylinder head 23.

On starting up the engine, the control piston 5 is displaced inwards, that is, to the position shown in Fig. 1, so that the conical surface 13 of the control spindle 5a will abut against the lower seating surface 7 of the ring 4. The annular wall of the liner 8 is thus pushed far over the stationary liner 8a into the cylinder head 23, so that the size of the precombustion chamber 2 is greatly reduced and consequently occupies its smallest volume. The slot 9 and the opening 10 of the annular wall of the liner 8, lie opposite one another in the axial direction of the fuel jet 3a, whereby the fuel can be injected through these openings directly into the cylinder space 1. During the compression stroke of the piston in the power cylinder, only a small portion of the combustion air in said cylinder enters the precombustion chamber 2, without much eddying. The major portion of the combustion air remains as a quiescent body of hot air in the cylinder space 1. In this body of air the injected fuel is ignited with certainty, solely owing to the high state of compression, and is also burned under favourable conditions, entirely independently of the cool wall of the precombustion chamber. The combustion only spreads during the return or expansion stroke of the piston to the precombustion chamber 2 which thereby becomes highly heated. During normal operation of the engine (Fig. 2) the control piston 5 is displaced outwards, a sufficient distance to cause the seating surfaces 6, 12 of the ring and piston respectively to abut one another. In this position the open end of the liner 8 is substantially in alignment with the stationary liner 8a, so that the precombustion chamber 2 is enlarged and occupies its greatest volume. In this position of the piston 5 and the liner 8 the opening 10 is positively displaced out of the axial direction of the fuel jet 3a to a position adjacent the wall of the neck 11. During the compression stroke with the liner 8 in this position, a large portion of the combustion air will enter the precombustion chamber through the opening 10 which will now be offset relatively to the nozzle 3, and consequently, a strong eddy will be formed in the precombustion chamber, in which the fuel injected directly into the precombustion chamber will be admixed with the combustion air. The ignition and precombustion of the fuel will thereupon take place in the precombustion chamber 2, as in this chamber, owing to the favourable effect of its incandescent wall, the self-ignition point of the mixture is soonest reached. Under the increase in pressure which sets in during the combustion in the precombustion chamber 2 the mixture is forced out through the opening 10 into the cylinder space 1, being at the same time atomized.

In the example shown in Figs. 3 and 4 the control piston 5 slides directly in a cylindrical bore of the cylinder head 23 which forms the auxiliary chamber. The control piston is packed by rings 14 and the control spindle 5a by a stuffing box 15, so that behind the control piston 5a a space 2a is formed, which varies in size with the precombustion chamber 2. Between this space and the cylinder space 1 a communicating passage 18 is provided in the cylinder head (Fig. 3). In place thereof, as a modification, such a passage may be placed as at 19 (Fig. 4) in such a manner that during the outward stroke of the piston 5 it is swept over or closed by the latter. With this arrangement the axial direction of the fuel jet 3a coincides with the cylinder axis. The liner 8 in addition to the opening 10, has a second, considerably smaller aperture 16 which lies in the direction of motion behind the first opening 10 and is only uncovered, when the latter is partially covered by the cylinder wall.

In this constructional form, when the parts are in the normal operative position shown in Fig. 3, the combustion air enters the precombustion chamber 2 simultaneously by way of the communicating openings 10, 16, whereby a far more energetic eddying motion is caused in the chamber. It is also possible with this construction suitably to regulate the compression volume of the cylinder independently of the magnitude at any time of the precombustion chamber volume. When the communicating passage is disposed as at 18, the compression volume can for instance be kept constant over the entire operative range. When the precombustion chamber 2 is reduced in size and the space 2a correspondingly increased (Fig. 4), a large portion of the combustion air passes into the said space and is returned to the combustion space 1, only after the precombustion is completed, as supplementary or additional air. When the size of the precombustion chamber 2 is increased and the space 2a diminished to a corresponding extent, no appreciable portion of the air will enter this space, so that the main combustion remains unaffected. When the communicating passage is disposed as at 19, the compression volume can be kept constant only in the lower operative range. After a certain displacement of the control piston 5, the remaining volume of the space 2a is positively cut off through the piston sliding over this communicating passage, so that with a further displacement of the control piston 5 the engine will again operate with a decreasing compression. In these cases, in spite of the compression condition remaining constant over the whole or the lower part of the operative range, all the advantages are maintained, which accrue from the fundamentally different operative methods of the engine in these operative ranges.

In the constructional example according to Figs. 5 and 6 the control piston 5 slides in a bore or chamber in the cylinder head 23, which is parallel to the cylinder. The control spindle 5a is guided in the shaft bearing block 24 which also secures the guide ring 4. The bell-shaped liner 8 is fixed by a screw connection 25 to the control piston 5 and the liner 8a is fixed by a holder 26 to the cylinder head 23. The liner 8 is provided with an extension 20 which is adapted to pass over the stationary liner 8a when the control piston moves downward and which, after the communicating opening 10 has been completely covered by the adjacent cylinder wall, uncovers a further communicating passage 21 between the precombustion chamber 2 and the cylinder space 1. This kind of construction makes possible a compact arrangement of the precombustion chamber 2 as regards the built-in valve. It is also possible, owing to the gap 21 which opens between the liner 8 and the stationary liner 8a, to improve the inflow and outflow and to reduce wear on the liners 8 and 8a, more particularly through the better cooling conditions.

The invention is not limited to these constructional examples. In place of the piston slide valve, a rotary valve may be used. The displacement of the piston slide valve may also be effected by levers or screws. In the case of multi-cylinder engines this displacement may take place common to all the cylinders, either optionally or automatically. The precombustion chamber 2 may be disposed in any way with respect to the cylinder, if only the essential feature, namely the injection of the fuel through it into the cylinder space on the one hand and the eddying conveyance of the combustion air into the precombustion chamber on the other hand be preserved.

What I claim is:

1. An injection internal combustion engine having in combination with a power cylinder provided with an auxiliary chamber communicating with said cylinder, and having a fuel injection nozzle, a precombustion chamber arranged in said auxiliary chamber and comprising a hollow sliding member and a stationary liner member, said sliding member being movable relatively to the stationary member, whereby the volume of the precombustion chamber is rendered variable, in order that a reduced volume may be used for starting and an enlarged volume for normal operation, the said hollow sliding member having an opening in its wall and the power cylinder also having an opening, through which openings the precombustion chamber communicates with the power cylinder, and the hollow sliding member having a further opening in its wall through which the precombustion chamber receives the jet from the fuel nozzle, the opening in the hollow sliding member, through which the precombustion chamber communicates with the power cylinder being capable of displacement into and out of alignment with the injection nozzle upon movement of the sliding member toward or away from the stationary liner member for varying the point of entrance of the stream of combustion air into the precombustion chamber from the power cylinder relatively to the direction of the fuel jet whereby, when the precombustion chamber is of reduced volume during starting, the communicating opening in the hollow sliding member towards the power cylinder lies in the axial direction of the fuel jet and, when the precombustion chamber is of enlarged volume during normal operation, the said opening is displaced out of this axial direction and the combustion air is guided along part of the precombustion chamber wall and is mixed with the fuel as it is being injected into the precombustion chamber.

2. An injection internal combustion engine as claimed in claim 1, in which the hollow sliding member of the precombustion chamber is bell-shaped, in combination with a piston for displacing the said hollow sliding member relatively to the stationary liner member, the opening in the wall of the hollow sliding member facing the injection nozzle extending longitudinally thereof and the opening on the side facing the power cylinder having a section corresponding to the shape of the cross-section of the fuel jet.

3. An injection internal combustion engine as claimed in claim 1 and in which in addition to the opening in the wall of the hollow sliding member facing the power cylinder there is a further opening of considerably smaller diameter, which is so disposed as to be capable of being uncovered only after the first-named opening has been partially covered by the cylinder wall, whereby, when the precombustion chamber is of enlarged volume, two communicating openings between the precombustion chamber and the opening in the power cylinder are simultaneously available.

4. An injection internal combustion engine as claimed in claim 1, in which the fixed liner member, over which the hollow sliding member is adapted to slide, is provided with an opening in the part over which the hollow sliding member slides, which opening lies opposite the communicating opening between the auxiliary chamber and the power cylinder, and the hollow sliding member having an extension capable of intervening between the said opening in the fixed member and the communicating opening between said auxiliary chamber and the power cylinder, so as to close and open the communication between the fixed member and the power cylinder, the said extension being so arranged with respect to the opening in the sliding member facing the power cylinder that, when the opening in the wall of the hollow sliding member facing the power cylinder has become completely covered by the wall of the auxiliary chamber adjacent the power cylinder, the opening in the fixed member communicates with the opening in the auxiliary chamber leading to the power cylinder.

5. An injection internal combustion engine as claimed in claim 1, having a second chamber of variable volume behind the hollow sliding member and a passage between the power cylinder and the said second chamber of variable volume.

6. An injection internal combustion engine as claimed in claim 1, having a piston in combination with the hollow sliding member for displacing the latter, a second chamber of variable volume behind the said piston and a passage between the power cylinder and the said second chamber of variable volume, the said passage being so positioned as to allow of it being swept over by the said piston after a definite volume of the precombustion chamber has been reached.

RUDOLF HAAG.